United States Patent [19]

Petcen

[11] Patent Number: 5,211,311
[45] Date of Patent: May 18, 1993

[54] CARTRIDGE FOR A DISPENSER OF REACTIVE CHEMICALS

[75] Inventor: Donald H. Petcen, Colonial Heights, Va.

[73] Assignee: E. R. Carpenter Company, Inc., Richmond, Va.

[21] Appl. No.: 778,362

[22] Filed: Oct. 17, 1991

Related U.S. Application Data

[63] Continuation-in-part of Ser. No. 370,310, Jun. 23, 1989, Pat. No. 5,090,814.

[51] Int. Cl.$^5$ .................. B05B 7/04; B05B 15/02; B01F 5/04; B01F 15/02
[52] U.S. Cl. .................... 222/145; 222/149; 239/118; 239/414; 277/24; 366/173; 366/184
[58] Field of Search .................. 222/135, 145, 149; 239/114–118, 123, 398, 412, 413, 414, 434, 527; 366/138, 162, 167, 173, 177, 182, 184, 150, 159–161; 422/133, 135; 92/165 R, 168 R; 277/24, 205, 206 R, 212 C

[56] References Cited

U.S. PATENT DOCUMENTS

| Re. 29,665 | 6/1978 | Gusmer et al. . | |
|---|---|---|---|
| 1,530,554 | 3/1925 | Goseett . | |
| 2,020,122 | 11/1935 | Padgett . | |
| 3,144,210 | 8/1964 | Levy . | |
| 3,179,341 | 4/1965 | Plos et al. . | |
| 3,263,928 | 8/1966 | Gusmer . | |
| 3,417,923 | 12/1968 | Carlson | 239/414 X |
| 3,606,170 | 9/1971 | Hoffman et al. | 239/417.5 X |
| 3,687,370 | 8/1972 | Sperry et al. . | |
| 3,786,990 | 1/1974 | Hagfors . | |
| 3,848,624 | 11/1974 | Banike . | |
| 3,876,145 | 4/1975 | Gusmer et al. . | |
| 3,945,569 | 3/1976 | Sperry . | |
| 4,023,710 | 5/1977 | Alexander et al. . | |
| 4,023,733 | 5/1977 | Sperry et al. . | |
| 4,039,197 | 8/1977 | Schmidt et al. . | |
| 4,043,486 | 8/1977 | Wisbey . | |
| 4,067,584 | 1/1978 | Hunger . | |
| 4,070,008 | 1/1978 | Schlieckmann . | |
| 4,123,007 | 10/1978 | Gardner | 239/414 |
| 4,133,483 | 1/1979 | Henderson . | |
| 4,159,079 | 6/1979 | Phillips, Jr. . | |
| 4,377,256 | 3/1983 | Commette et al. . | |
| 4,427,153 | 1/1984 | Schaefer | 239/117 |
| 4,453,670 | 6/1984 | Sirovy | 239/117 |
| 4,469,251 | 9/1984 | Sperry et al. . | |
| 4,523,696 | 6/1985 | Commette et al. . | |
| 4,529,126 | 7/1985 | Ives . | |
| 4,568,003 | 2/1986 | Sperry et al. . | |
| 4,613,140 | 9/1986 | Knox . | |
| 4,708,292 | 11/1987 | Gammons | 239/414 |
| 4,759,265 | 7/1988 | Stoll et al. . | |
| 4,867,346 | 9/1989 | Faye et al. | 222/145 |
| 4,993,596 | 2/1991 | Brown . | |
| 5,104,006 | 4/1992 | Brown | 222/145 |

OTHER PUBLICATIONS

PCT Publication No. WO/86/06654 dated Nov. 20, 1986 to Brown.

Primary Examiner—Harvey C. Hornsby
Assistant Examiner—Charles Cooley
Attorney, Agent, or Firm—Beveridge, DeGrandi, Weilacher & Young

[57] ABSTRACT

A cartridge for use in a mixing, dispensing and purging apparatus of mutually reactive chemicals. The cartridge comprises a mixing assembly and purging rod. The mixing assembly includes a core member that is preferably deformable with an axial bore formed in it through which the purging rod reciprocates. The mixing assembly also includes a scraper assembly positioned within the mixing assembly. The scraper assembly includes two cup-shaped members positioned essentially in mirror image with each cup-shaped member including an aperture in its base through which the purging rod extends. An insert is positioned within both of the cup-shaped members and extends between the base of each cup-shaped members. The cup-shaped members and insert are designed to remove material built up on the reciprocating purging rod while keeping the rod aligned and preventing fluid flow through the scraper assembly. The scraper assembly thus alleviates the need for any solvent material.

17 Claims, 8 Drawing Sheets

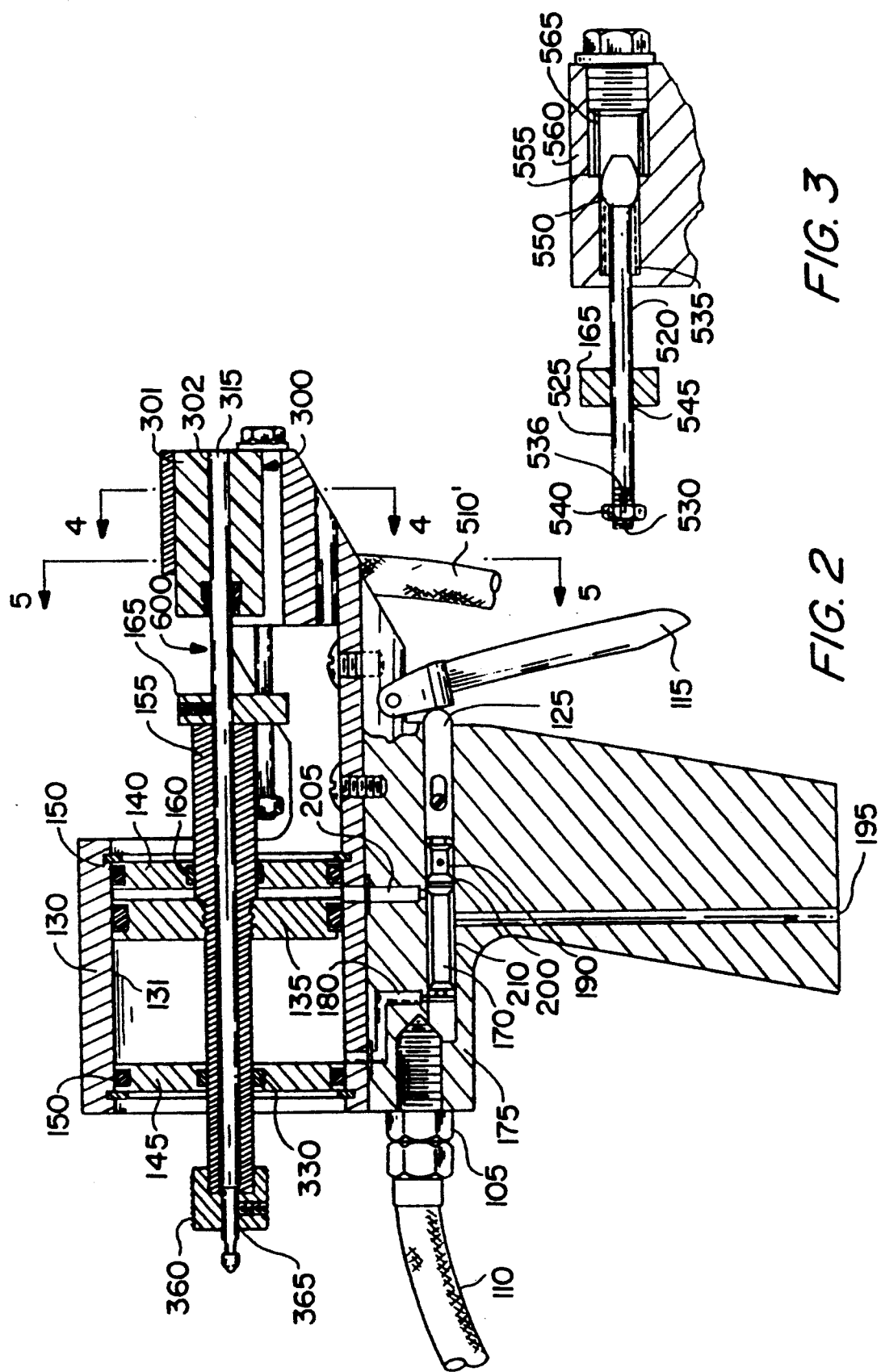

FIG. 11
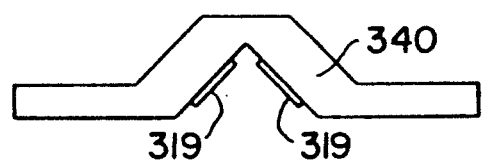
FIG. 12
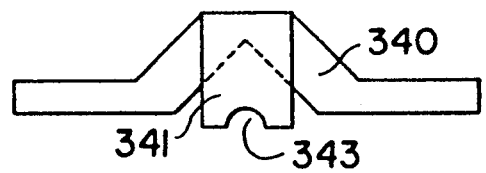
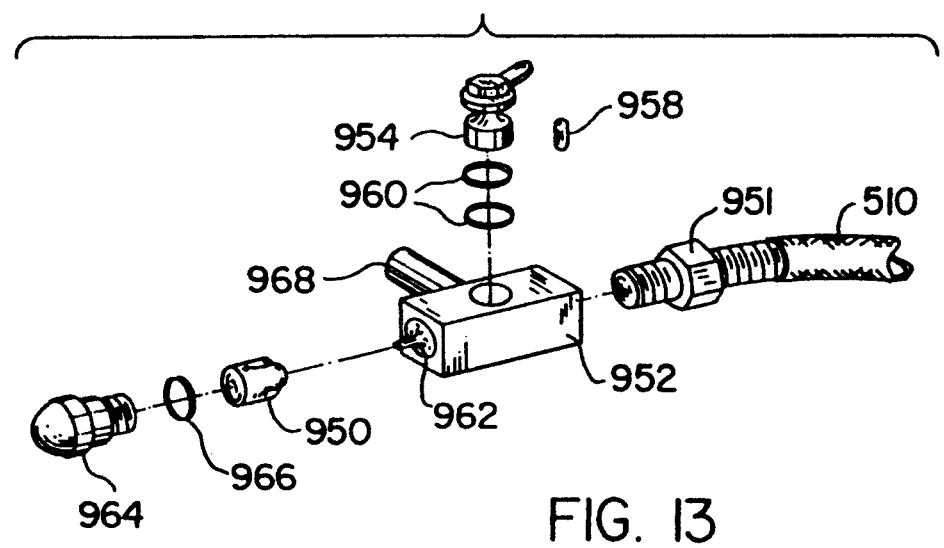
FIG. 13

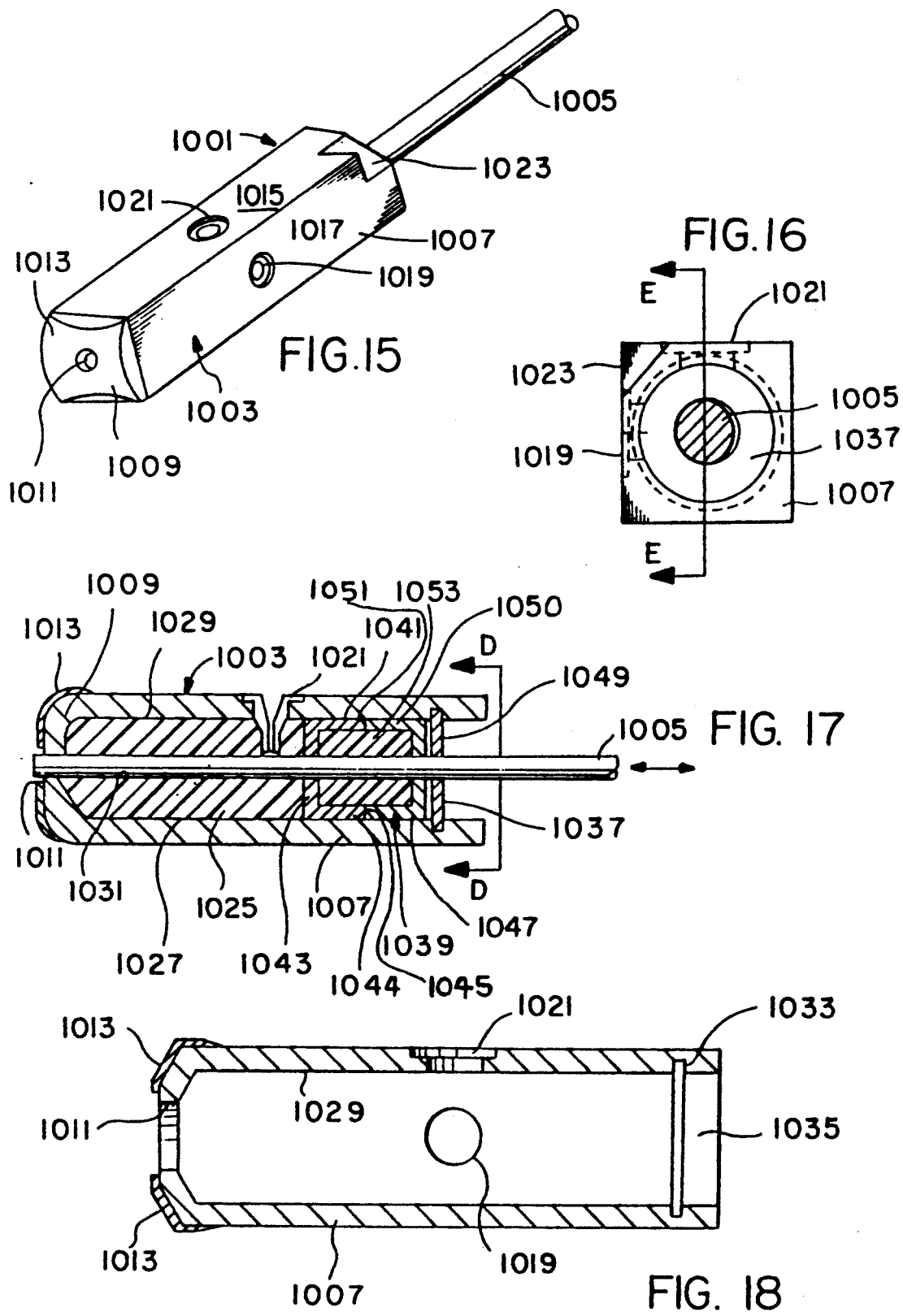

CARTRIDGE FOR A DISPENSER OF REACTIVE CHEMICALS

RELATED APPLICATION(S)

This application is a continuation-in-part of U.S. Ser. No. 07/370,310 filed Jun. 23, 1989 which issued on Feb. 25, 1992 as U.S. Pat. No. 5,090,814. This patent is incorporated herein by reference.

FIELD OF THE INVENTION

This invention relates generally to mixing, dispensing and purging a plurality of reactive chemicals, and in particular to a cartridge for mixing, dispensing and purging polyurethane precursor chemicals used to make polyurethane foam and coatings.

BACKGROUND OF THE INVENTION

There has come into general use a class of synthetic polyurethane which is formed by the reaction of two highly reactive chemicals, typically an organic resin and a polyisocyanate. These chemicals are relatively stable when alone, but when mixed in the proper portion, react within a very few seconds to form a polyurethane foam.

Depending upon the specific composition of the chemicals used to make the polyurethane, the mixture can be made to foam as it sets, so as to make the polyurethane foam suitable for use in a variety of applications, including insulation and foam-in-place cushioned packaging material. The fast reaction and setting of the chemicals to form the polyurethane foam is highly desirable from the standpoint of high production rates of the foam, but reaction of the chemicals inside the dispensing equipment can clog and jam the internal parts of the dispensing equipment, rendering the equipment inoperative.

To alleviate some of the problems of mixing and dispensing of polyurethane foam precursor chemicals, several different approaches to the design of dispensing equipment for polyurethane foams have been suggested.

A type of polyurethane foam dispensing equipment in wide use is exemplified in U.S. Pat. No. 3,263,928. The device disclosed in this patent includes a mixing chamber assembly having a Teflon core circumferentially and axially contained within a metallic housing. The Teflon core has an axial bore therethrough with individual inlets therein for the injection of the reactive chemicals from respective sources of supply into the bore and a valving rod reciprocally movable within the bore. The Teflon core is maintained under a compressive force by a threaded nut disposed at the rear of the mixing chamber core to keep an interference fit between the valving rod and the Teflon core to maintain proper sealing of the inlets with the valving rod.

The valving rod of the '928 patent is connected to an air piston which is actuated by means of a trigger. When the trigger is depressed, the valving rod is reciprocated back to uncover the inlets, thereby allowing entry of the reactive chemicals into the bore for mixing and dispensing out the front of the bore. After the desired quantity of the mixture has been dispensed, the rod is reciprocated forward to close off the ports to prevent further entry of the reactive chemicals into the bore. The valving rod is then moved still forward to the end of the bore so as to purge mixed chemicals which remain in the mixing chamber bore.

This design has met with a limited degree of success, but has many drawbacks. Despite the interference fit between the valving rod and the bore, as the valving rod is actuated a number of times, a gradual build-up of reacted polyurethane material on the valving rod occurs. Even though Teflon is an inherently low friction material, as polyurethane adheres to the valving rod, the friction and/or adhesion which develops between the valving rod and the core may increase to the point where the valving rod becomes jammed in the bore and cannot be reciprocated by the air cylinder. When this happens, the dispensing equipment is rendered inoperative and must be disassembled and cleaned to free the valving rod. In time, the Teflon core itself may become unserviceable due to wear. In this case, after removal of the valving rod from the Teflon core, the Teflon core itself must be removed from the housing and replaced, which is a laborious process. During such repair, the apparatus is unusable.

Other proposals for minimizing the potential for jamming of the valving rod in the bore are disclosed in U.S. Pat. Nos. 3,687,370 and 4,023,733. These dispensing devices have a Teflon mixing chamber core with a bore therethrough fitted into a metallic housing. The disclosed devices also include a valving rod fit tightly into the bore and reciprocal to selectively seal or open the ports, similar to the operation shown in U.S. Pat. No. 3,263,928, except without means for axially compressing the Teflon core. The devices disclosed in U.S. Pat. Nos. 3,687,370 and 4,023,733, however, are provided with a reservoir containing a solvent material behind the mixing chamber. When the rod is reciprocated to the rearward position, the back of the rod is bathed in the solvent, which acts to prevent the reaction of the precursor chemicals and dissolve built-up polyurethane, which is said to reduce the tendency of the valving rod to jam in the Teflon mixing chamber. However, jamming can still occur, and such jams necessitate disassembly and cleaning of the equipment. In some cases, the jamming may be so serious as to require removal and replacement of the Teflon core from the housing, which is a time consuming and laborious process requiring special equipment. During such repair or replacement, the apparatus is unusable. Furthermore, the solvent itself is usually toxic.

U.S. Pat. Nos. 4,469,251 and 4,568,003 disclose a dispensing device similar to the device disclosed in U.S. Pat. No. 3,263,928, but which include proposals for simplifying replacement of the mixing chamber assembly and valving rod in the event jamming occurs.

These patents teach use of dispensing apparatus having a detachable mixing chamber assembly. The mixing chamber assembly has a Teflon core having a bore and a valving rod in an interference fit in the bore. The Teflon core is axially and circumferentially retained in a non-deformable housing, which is also part of the detachable mixing chamber assembly. This housing axially and radially contains and compresses the Teflon core to maintain the interference fit. These patents further teach use of non-deformable inserts in the inlets to maintain the shape of the inlets during use. Belleville spring washers are also provided at one end of the housing to maintain the Teflon under a compressive force. This, it is said, maintains the interference fit between the valving rod and the bore so as to maintain an effective seal between the valve and the bore to prevent leakage. However, jamming may still occur, and in this event, the mixing chamber, and hence the device, becomes unusable.

In an effort to reduce the time during which the device of U.S. Pat. Nos. 4,469,251 and 4,568,003 is unusable, the disclosed mixing and dispensing apparatus has two separable portions. One portion includes a mixing chamber assembly, including the non-deformable housing, Teflon core, non-deformable inserts, valving rod and Belleville washers; and another portion includes means for reciprocating the valving rod. When the mixing chamber assembly becomes jammed or otherwise fails to function, the entire mixing chamber assembly, including the non-deformable housing, Teflon core, non-deformable inserts, valving rod and Belleville washers, are removed from the other portion of the apparatus and replaced with a fresh assembly.

While ostensibly an improvement over the type of dispenser disclosed in U.S. Pat. Nos. 3,263,928; 3,687,379 and 4,023,733, the apparatus disclosed in these later patents has some disadvantages. Use of a reciprocal rod in the bore of the Teflon core as the valving means for the inlets is undesirable. Because the chemicals are maintained under pressure directly adjacent the valving rod, unless the core is kept under a high compressive force to maintain a tight interference fit between the valving rod and the bore, the chemicals have a tendency to leak around the valving rod when the valving rod is in the forward position, causing premature reaction of the chemicals and thus contributing to jamming and clogging of the inlets. Furthermore, the relatively high compression necessary to maintain sealing of the valving rod in the Teflon core increases the friction between the valving rod and the Teflon core, and thus the force required to reciprocate the valving rod in the bore. Still further, the compression on the core has a tendency to cause the non-deformable inserts in the inlets to back away from the rod to the extent permitted by the non-deformable housing. This can potentially allow the Teflon material of the core itself to extrude underneath the discharge end of the insert to occlude the inlets.

Teflon material is also a material which exhibits a tendency to "cold flow". Thus, Teflon material will flow when subjected to a compressive force. The tight compressive force necessary between the mixing chamber core and the associated valving rod has a tendency to compress the Teflon radially inwardly and facilitate jamming. In time, after a number of valve rod reciprocations, the inner surface of the core is shaved somewhat destroying the integrity of the tight interference fit. This shaving problem is especially acute when the valve rod is tilted or non-aligned within the core.

Furthermore, the mixing chamber assembly with its non-deformable housing, Belleville washer assembly for maintaining the Teflon core under compression, Teflon core, non-deformable inserts and valving rod is relatively expensive. Discarding the entire mixing chamber assembly is undesirable because of the expense, particularly since the failure is usually confined to only the Teflon core itself and valving rod (which are themselves relatively inexpensive). However, because the Teflon core is tightly contained within the circumferential housing, removal and replacement of the Teflon core and valving rod alone from the housing is difficult and requires special equipment.

U.S. Pat. No. 4,377,256 to Commette et al. discloses an apparatus for dispensing a mixture of mutually reactive liquids, such as a hardenable plastic foam. The apparatus includes a purging rod which reciprocates within a mixing chamber. At the rear end of the mixing chamber is formed a counter bore which partially receives a scraper. The scraper includes a cylindrical outer sleeve with a converging front wall that converges into a sharp edge. A plastic bushing is maintained within the cylindrical outer sleeve by way of a washer force fitted into the rear portion of the cylindrical sleeve. The rear edge of the cylindrical sleeve is pressed tightly against a recess formed in the gun block. Within the recess formed in the gun block is also positioned a felt wiper saturated with a solvent material.

Commette et al. rely on the scraper as well as the solvent to avoid build up of material on the purging rod. The use of solvent wipers necessitates additional maintenance requirements that are often neglected resulting in the sticking of the purging rod. Also, Commette et al., in partially relying on the use of the solvent, suggests the use of tolerances that are not sufficiently low enough to avoid build up on the purging rod. This results in an abrading of the plastic insert due to solidified build up on the rod. The degrading of the insert also allows the fluid in the chamber to leak past the sharp edge of the scraper, past the insert and out through the back of the mixing chamber.

Further, the force fitting of the rear washer and the high degree of compression forcing the scraper into the shoulder of the counter bore formed in the gun block prevents a slight shifting of the scraper components which slight shifting can be useful in avoiding sticking of the purging rod. and providing dynamic stability. Also, the use of the sharp edge scraper and the low axial length to width ratio of the scraper and plastic insert in Commette is not entirely sufficient in avoiding misalignment of the purging rod and the resultant scraping of the interior of the nozzle.

SUMMARY OF THE INVENTION

The present invention, among other things, present a solution to the aforementioned problems of the prior art by providing a cartridge for use in a dispensing apparatus for mutually reactive chemicals which cartridge features a mixing and purging assembly that prevents build up of the reacted material on a reciprocating purging rod and helps to ensure proper alignment of the purging rod.

In one respect, the invention features a mixing assembly which includes a block of preferably deformable material having a scraping assembly retained within the mixing assembly. The scraping assembly is designed to alleviate the need for solvents in the removal of material build up on a reciprocating purging rod. Moreover, the scraping assembly ensures proper orientation and prevents tilting of the purging rod with respect to the block so as to avoid "lock up" of the rod within the mixing assembly. In maintaining the purging rod aligned, there is also avoided the problem of excessive wear caused by a non-aligned rod scraping within the interior of the mixing assembly.

The scraping assembly of the present invention also provides a means for keeping the entire purging rod clean so as to avoid built up material degrading or eroding the mixing chamber formed in the cartridge. The scraping assembly also helps to prevent the reactive fluid from flowing out the rear of the cartridge. Further, the scraping assembly provides an added degree of dimensional stability both within the interior of the cartridge and externally of the cartridge.

The block of deformable material forming part of the mixing assembly has an axial bore formed therein which extends from the rearward end to the forward end of the block. The scraping assembly is positioned within the block closer to the rear end of the block than to the front end, and behind a pair of fluid inlet openings formed in the block for passage of the reactive chemicals. The scraping assembly includes a first cup-shaped member and a second cup-shaped member with each cup-shaped member including a base portion, a side portion, and a rim portion. The first and second cup-shaped members are positioned within recesses formed entirely within the interior of the block and arranged such that the rim portions of the cup-shaped members are closer to one another than their bases. In a preferred embodiment the rims of the cup-shaped members are in contact but free to move slightly away from one another. Each of the cup-shaped members has an aperture formed in its base which is dimensioned so as to place the cup-shaped members in a scraping relationship with a purging rod which extends through both of the apertures.

An insert, preferably of Teflon material, is positioned between the base portions of the cup-shaped members. The insert includes a through-hole through which the reciprocating purging rod passes.

The cup-shaped members are preferably formed of a metallic material such as hardened steel and the surface defining the apertures formed in each cup-shaped member is dimensioned so as to provide both a scraping function and a bearing function. The through-hole formed in the insert is essentially of the same dimension as the bore and thus serves the function of a bushing with respect to the reciprocating rod.

The sides of the cup-shaped members are preferably made of different thicknesses and the recesses formed in the block are also made of varying depths such that the interior surface of the cup-shaped members forms an essentially continuous surface from the base of one cup-shaped member to the base of the other cup-shaped member. This arrangement allows for use of a cylindrical shaped insert.

A first of the two cup-shaped members is preferably positioned such that its base portion is commensurate with the rearward end of the block member. The first cup-shaped member also has a side thickness which is less than that of the second cup-shaped member. The second cup-shaped member is positioned within a recess just forward of the first cup-shaped member so that the rims of each cup-shaped member are in contact and, yet, free to rotate with respect to each other. The difference in thickness of the sides of each cup-shaped member also positions an overhanging portion of the block's interior in abutment with the portion of the second cup-shaped member's rim which is not in contact with the rim of the first cup-shaped member.

The tolerance between the surface of each cup-shaped member and the exterior of the reciprocating purging rod are such that virtually any build up of hardened material is scraped off and the rod is kept aligned as it passes within the interior of the block.

The invention also features a cartridge assembly which includes the mixing assembly as well as a reciprocating purging rod dimensioned so as to pass within the mixing assembly. The reciprocating rod also includes connection means at one end for connecting with reciprocating means forming part of a dispensing apparatus to which the cartridge is releasably attached. The cartridge assembly is designed for quick release and replacement within a dispensing apparatus such that the down time of the dispensing apparatus is kept to a minimum. The design of the mixing assembly, however, enhances the life of the cartridge itself thus reducing the need for replacement.

The invention also involves a dispensing apparatus which is particularly suited for use with the aforementioned cartridge. The dispensing apparatus is pistol-shaped and includes a plurality of air ports and valves for directing pressurized air to a piston assembly such that a piston moves either forward or rearward. The piston is connected to the purging rod so that the purging rod reciprocates along with the piston.

The mixing assembly is releasably connected to holding means provided at the forward end of the dispensing apparatus. The free end of the purging rod is positioned so as to travel within the mixing assembly. When the piston is in its forward-most position, the free end of the purging rod is positioned essentially commensurate with the forward end of the mixing assembly. When the piston is in its rearwardmost position, the purging rod is placed rearward of the inlets for the mutually reactive chemicals and preferably in the general area of the base of the forwardmost cup-shaped member forming part of the scraper assembly positioned within the mixing assembly and, more preferably, at about the axial midpoint of the surface defining the aperture in the base of the forwardmost cup-shaped member. This positioning of the retracted rod helps in assuring that all of the material built up on the rod is removed and, during the purging cycle, that all scraped material is purged from the mixing chamber.

The dispensing apparatus also includes a reactive chemical valving and passageway arrangement that is designed to introduce the reactive chemicals, when in an open state, into the respective fluid passageways formed in the mixing assembly. The valving and passageway arrangement also features a pair of spaced needle valves in indirect attachment with the reciprocating purging rod and positioned such that, when the purging rod is retracted, the pair of fluid passageways leading to the mixing assembly are open and fluid is free to pass through the mixing assembly and into the mixing chamber. When the purging rod begins to move towards its forward position, the needle valves are positioned so as to block off the fluid passageways leading to the mixing assembly. This arrangement allows for the pressure relief of the fluid passageways down stream of the valve prior to the passage of the purging rod past the chemical inlets in the Teflon block.

A further embodiment of the invention features a cartridge assembly that includes a purge rod and a mixing assembly which comprises a deformable member having a longitudinal passageway formed therein. The longitudinal passageway defines a mixing chamber for the reactive chemicals and the passageway has an outlet end through which the mixed reactive chemicals exit. The purge rod is dimensioned for reciprocal travel within the longitudinal passageway. The mixing assembly includes an exterior surface and first and second chemical passageway which pass from the exterior surface and open into the mixing chamber.

Positioned within the mixing assembly is scraping means for avoiding build up of the reactive chemicals on the purging rod. The scraping means include first and second cup-shaped members positioned within the mixing assembly. Each of the cup-shaped members includes a base portion and a rim portion. The rim portions are positioned adjacent one another and the separated base portions include apertures aligned with the longitudinal passageway. The scraper assembly includes a deformable insert surrounded by the interior surface defining the rim portions of the cup-shaped members. The insert includes a through-hole aligned with the longitudinal passageway. The purge rod is thus dimensioned and arranged for reciprocal travel within the longitudinal passageway and the aligned through-hole and apertures formed in the base members and deformable insert. The apertures in the cup-shaped member are sized so as to create a scraping relationship with respect to the purge rod.

In this embodiment, the mixing assembly includes an essentially non-deformable shell housing having an exterior which defines the exterior surface of the mixing assembly. The shell housing includes an interior surface which is in contact with the deformable member or core member within which is formed the longitudinal passageway. The first and second chemical passageways extend through the outer shell housing, through the core member and into the mixing chamber.

The outer shell housing includes an inner circumferential groove and the mixing assembly further includes a ring member positioned within the circumferential groove. The ring member includes an aperture that is aligned with the longitudinal passageway and dimensioned to receive the purging rod therethrough. The scraper means is positioned and retained between the core member and the ring member.

The shell housing includes an open back end which facilitates insertion of the snap ring into the circumferential groove. The dispensing end of the shell housing converges inwardly to form an aperture that is aligned with the longitudinal passageway and dimensioned to receive therethrough the purging member. The core member has a shape which corresponds with the shell housing and therefore the core member includes a converging front or dispensing end.

The mixing assembly also includes first and second non-deformable inlet nozzle members each having an interior surface defining at least a portion of the chemical passageways. The inlet nozzles extend radially from the exterior surface of the shell housing towards the mixing chamber. The inlet nozzles each include a central axis which intersects at essentially the same point on the central axis of the longitudinal passageway. The central axes for the inlet nozzles are also preferably transverse to one another. The inlet nozzles are positioned closer to the scraping means than to the outlet end of the longitudinal passageway. The inlet nozzles include an outlet end which includes a rim portion essentially commensurate with the interior surface of the core member defining the mixing chamber. The outlet ends of the nozzle also feature a concave depression having an outer circumference defined by the rim portion.

The converging exterior portion of the shell housing which is at the outlet end of the shell housing is coated with a low friction material (e.g., TEFLON TM material) which facilitates cleaning off of deposited chemical reactives and avoids rusting. A three layer coating of TEFLON material has proven suitable for the purposes of the present invention.

The cup-shaped members of the scraping means preferably are formed so as to have an external circumference essentially the same as that of the deformable core member and thus essentially the same as the interior surface of the shell housing. The base of the innermost cup-shaped member is essentially in an abutting relationship with the deformable core member while the other cup-shaped member is near or essentially in an abutting relationship with the ring member. In this way, the scraping means is retained in the proper position with respect to the purge rod while avoiding having to place the deformable member in a state of compression which could lead to increased jamming due to a closing of the longitudinal passageway defined by the deformable core.

The shell housing has a quadrilateral cross-section rearward to the converging dispensing end. The nozzle members are formed in two adjacent sides of the metallic shell housing. At the rearward end of the shell housing a corner is notched so as to facilitate the proper positioning of the cartridge with respect to the underlying dispenser support and the overlying clamping members. The notch portion of the shell housing provides a quick reference guide to an operator of the associated dispensing apparatus support structure. The incorporation of a retaining ring and the positioning of the scraper assembly behind the core member necessitates a longitudinal extension of the mixing assembly compared to the previously described embodiments. The notch portion of the shell housing provides a reference location (i.e., the innermost edge of the notch) which is lined up with a portion of the dispensing apparatus support structure such that the free end of the purge rod moves to the correct position (e.g., the position described for the previous embodiment) at maximum extension and retraction. Use of the notch approach allows the present inventions cartridge to be installed on existing field units with only minimal changes.

The present invention thus provides a solventless means for preventing material build up on a reciprocating purging rod which ensures prolonged and uninterrupted use of the dispensing apparatus and avoids the problems of having the purging rod becoming non-movable. The invention also achieves such advantages without the need for expensive and complicated components.

BRIEF DESCRIPTION OF THE DRAWINGS

The foregoing and other objects, features and advantages of the present invention will become clear upon review of the detailed description and drawings, wherein:

FIG. 2 is a cross-sectional view taken along the line 2—2 of FIG. 1 showing the internal arrangement of the dispensing apparatus;

FIG. 3 is a detailed cross-sectional view showing the construction of a needle valve constructed in accordance with one embodiment of the invention.

FIG. 11 shows an alternate embodiment of the retainer;

FIG. 12 shows, in rear view, the clip member in attachment with the retainer;

FIG. 13 shows an exploded view of the chemical filtering device of the present invention;

FIG. 15 shows a perspective view of another cartridge embodiment;

FIG. 16 shows an end view of the cartridge in FIG. 15 taken in the direction of line D—D shown in FIG. 17;

FIG. 17 shows a cross-sectional view of the cartridge shown in FIG. 15 taken along line E—E in FIG. 16;

FIG. 18 shows a cross-sectional view of the of the mixing assembly.

DETAILED DESCRIPTION OF THE DRAWINGS

Figure 1:
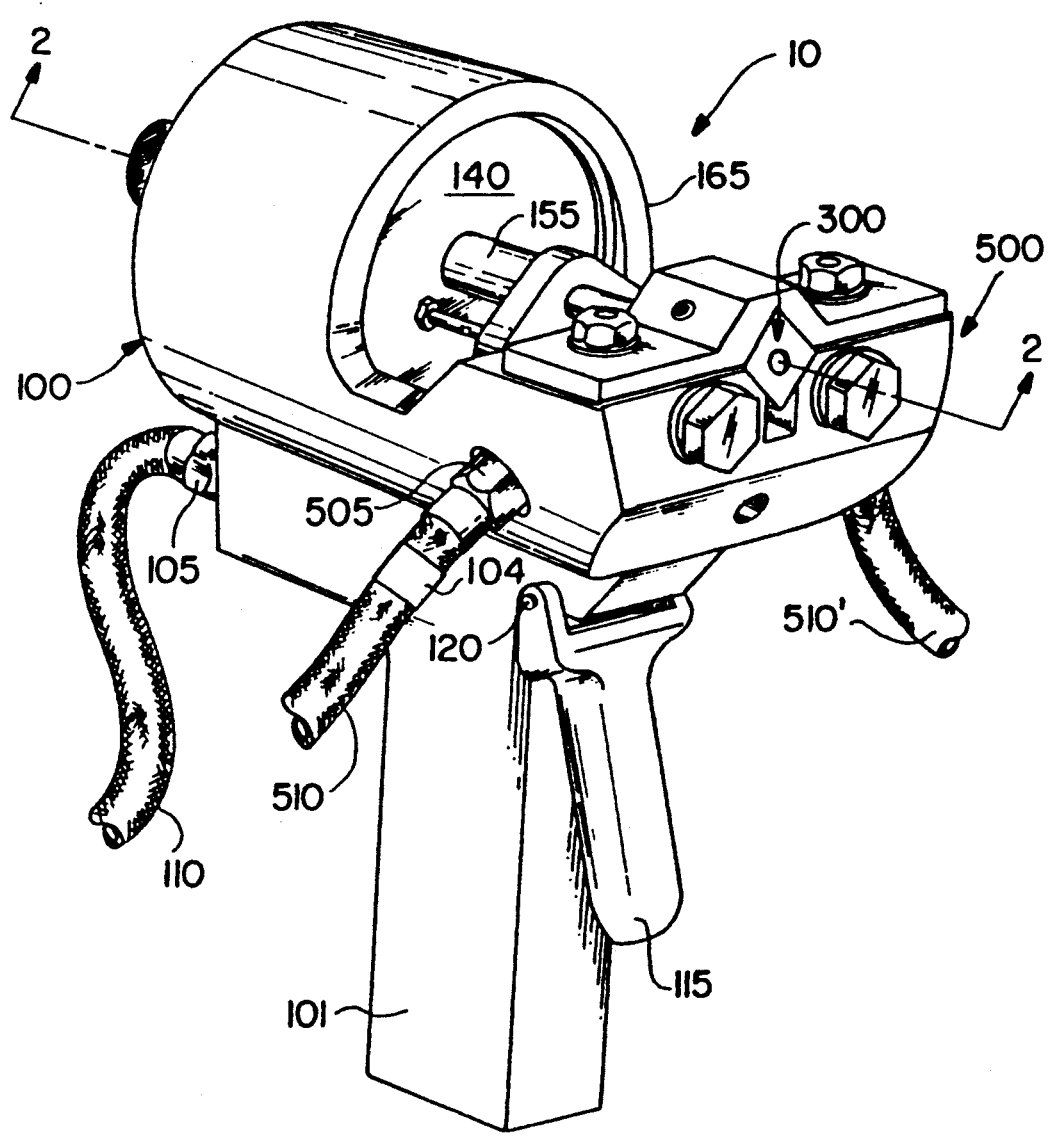
FIG. 1 is an isometric view of a dispensing apparatus constructed in accordance with one embodiment of the invention.
Figure 4:
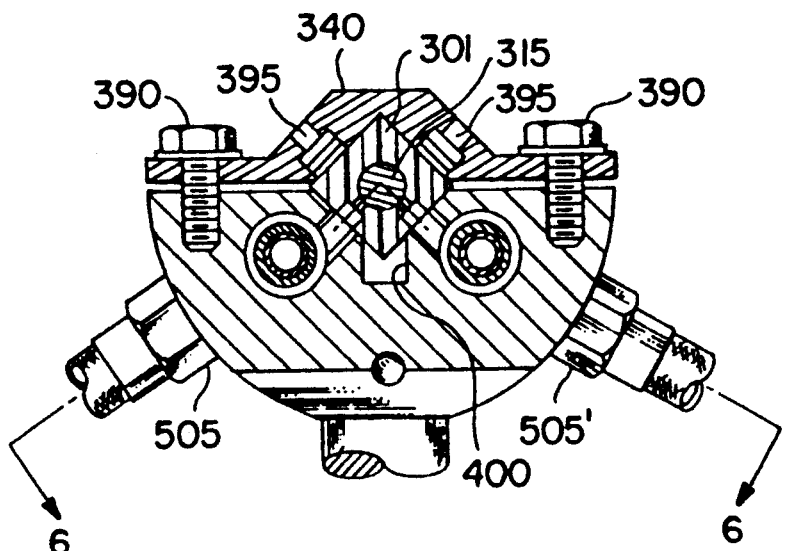
FIG. 4 is a cross-sectional view taken along the line 4—4 of FIG. 2 showing the arrangement of the conduits and mixing assembly.

Referring now to the drawings in detail, and initially to FIG. 1, dispensing apparatus 10, constructed in accordance with one embodiment of the present invention, is illustrated. Apparatus 10 includes a reciprocating driver portion 100, a chemical valving portion 500, and a mixing assembly portion 300. Reciprocating driver portion 100 includes a handle 101 which may be readily grasped by an operator. Handle 101 includes a connection 105 for a hose 110 leading to a source of compressed gas, such as air. A trigger 115 is hingeably attached to the handle by means of hinge pin 120. Trigger 115 presses on the exposed end of air valve 125 (FIG. 2), which controls motion of the air in a manner to be described further in this disclosure.

Referring now to FIG. 2, reciprocating driver portion 100 includes an air cylinder 130 with a cylindrical bore 131. A reciprocating air piston 135 fits within the cylindrical bore and reciprocally slides therein. Cylinder 130 has a front cover 140 and a rear cover 145 both of which are maintained relatively air tight with respect to cylinder 130 by means of O-ring seals 150. A piston rod 155 is connected to piston 135 and extends through front cover 140 towards the front of the apparatus. Piston rod 155 is sealed against air leakage where it passes through the front cover by means of an O-ring seal 160. A valve actuating yoke 165 is attached to the external end of the piston rod 155 and moves with it.

Compressed air supplied by means of hose 110 enters the rear of handle 101 and a sliding spool valve 170. When trigger 115 is not depressed, the pressure of the air from hose 110 urges valve 170 forwardly so that the seal 175 passes in front of passageway 180 leading to the portion of the air cylinder rearward of air piston 135. The rear portion of spool valve 170 is hollow, permitting passage of compressed air through the hollow section and out into the front section of the valve through ports 190. Thus, compressed air then passes through passageway 180 rearwardly of the piston, forcing the piston forward, while simultaneously opening exhaust passageway 195 to permit exit of air from between 135 piston and front cover 140.

When the trigger is depressed, spool valve 170 is slid rearwardly so that seal 200 passes rearwardly of passageway 205 leading to the front of air piston 135. When compressed air enters the air cylinder in front of the air piston, the air piston is forced rearwardly. Simultaneously, this movement causes the rear seal 175 of spool valve 170 to pass rearwardly of rear entrance port 180, allowing air contained within the space between the air piston and the rear cover to exit through the annular space 210 around the spool valve to exhaust passageway 195, and hence to the outside air.

Figure 7:
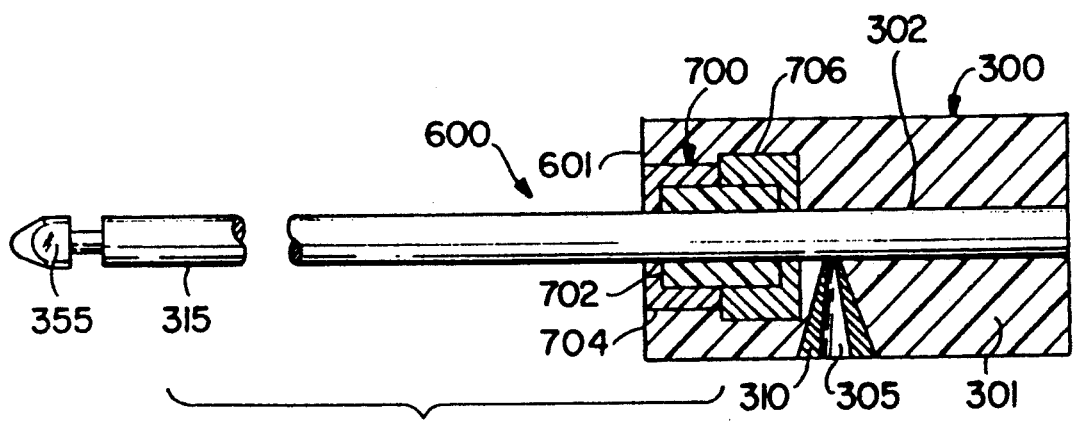
FIG. 7 is a cross-sectional view of the cartridge, which is shown in FIG. 1 attached to the dispensing apparatus, with the purging rod in an extended position.
Figure 8:
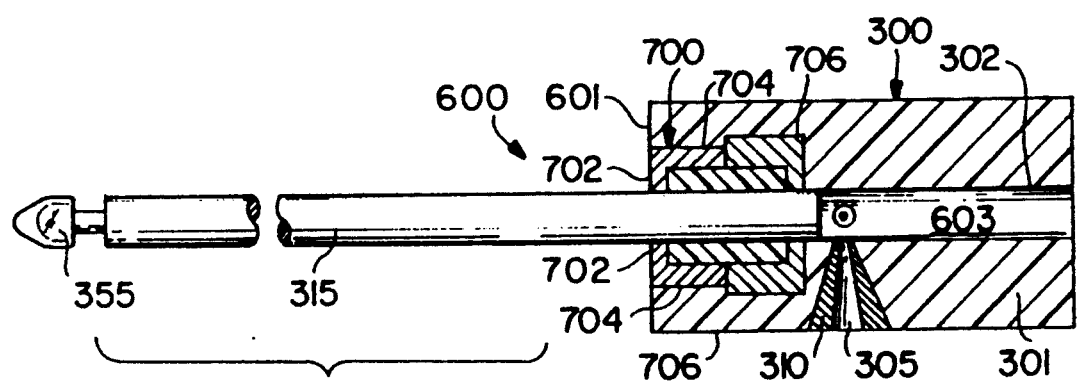
FIG. 8 is a cross-sectional view of the cartridge shown in FIG. 7 with the purging rod in a retracted position.

Purging rod 315 is slidably received within bore 302 and adapted to move within the bore from an extended position (FIGS. 1 and 7) where the front end of purging rod 315 extends to substantially the front end of the mixing chamber block 301 to a retracted position where the front end of the purging rod is rearward of inlets 305 and 305' (FIG. 8).

The chemical valving portion 500 of the apparatus, as best illustrated in FIGS. 3-6, includes connections 501 and 501' which receive the connecting end 505 and 505', respectively, of hoses 510 and 510', which are respectively connected to sources of supply of the chemicals to be mixed. A preferred form of the valve means for controlling the flow of each of the chemicals into the mixing chamber will be described. Only one of the respective valve means will be described, however, since the depicted valves for each of the respective chemicals are identical. From the entrance connection 501, the chemical passes into a conduit 515 leading towards a needle valve 520. Needle valve 520 has a stem 525 extending to the exterior of the conduit. The stem 525 has an exterior actuating end 530, and is sealed against leakage to the outside of the apparatus by means of a seal 535. The exterior actuating end 530 of the valve stem 525 passes through a hole 545 in yoke 165, and includes a threaded portion 536 with a nut 540 thereon which is larger than the hole 545 in the yoke. There is space intentionally left between the yoke and nut 540 so that the yoke must be retracted for some distance before it meets nut 540. The nut 540 can be screwed in or out to some degree. Preferably, the nut 540 is adjusted so that both valves open approximately simultaneously.

Instead of attaching the yoke to the piston rod, as depicted in the figures, the valves can be attached to each other by means of a collar. In this embodiment, the piston rod would be connected to the collar by means of a lost motion linkage, such as a shaft having an enlarged end passing through a hole in the collar, with a space provided between the enlarged end and the collar so that the piston rod would have to be retracted for some distance before it met the collar. The operation of this embodiment would be mechanically the same as the depicted embodiment.

Seal 535 is preferably made of Teflon, or other material which will not be chemically degraded by the chemical. Needle valve 520 has a conical portion 550 which fits into a seat 555. The seat 555 is preferably made of a material which will not be chemically degraded by the chemical being handled, and which will also effectively form a pressure tight seal, such as Teflon.

On the downstream side of seat 555, the conduit includes a filter screen 560 through which the chemical must pass on its way towards the mixing chamber. For convenience, the screen 560 is built into a screen retainer housing 565 which is threadably inserted into the front of the housing by means of threaded nut 570. After passing through the filter screen 560, the fluid passes through exit opening 370 and into inlet 305 formed in block 301.

Alternatively, instead of utilizing screens 560 and 560', a filter screen can be positioned in line with each of hoses 510 and 510' to remove any contaminates travelling in the reactant chemicals. This arrangement is achieved by insertion of a cleaning member 104, shown schematically in FIG. 1, in line with hoses 510 and 510'. Cleaning member 104 includes attachment means at each end suitable for quick release and non-leaking connection to the respective ends of hose 510. Within the cleaning member 104 is positioned a filter screen (not shown) suitable for blocking contaminates travelling in the fluid. The positioning of the screen in line with each of hoses 510 and 510' alleviates any problems with disruption of adjustments as might occur in having to remove threaded nut 570 to obtain access to screen 560.

FIG. 13 reveals an alternate means of filtering any contaminates which may happen to be in the mutually reactant chemicals while the chemicals travel towards mixing chamber 603 (FIG. 8). In FIG. 13, hose 510 is connected to hex nipple 951 which is threadably inserted into the end of housing 952. Also inserted into housing 952 is plug valve 954 with valve handle 956. O-ring 958 is positioned between the opening formed in plug valve 954 and the threaded extension of hex nipple 951. O-rings 960 are positioned above and below the plug valve 954. Filter screen 950 is inserted past internal snap ring 962 and screens fluid travelling through hose 510 and past plug valve 954. Filter screen 950 is maintained in place by screen plug 964 and leakage is prevented with O-ring 966. The fluid after passing through filter screen 950 exits out conduit 968 which is sealingly plugged into an appropriate receiving area in the valve housing; that is, in a manner similar to the way connected end 505 of FIG. 2 is inserting into the valve housing.

Figure 9:
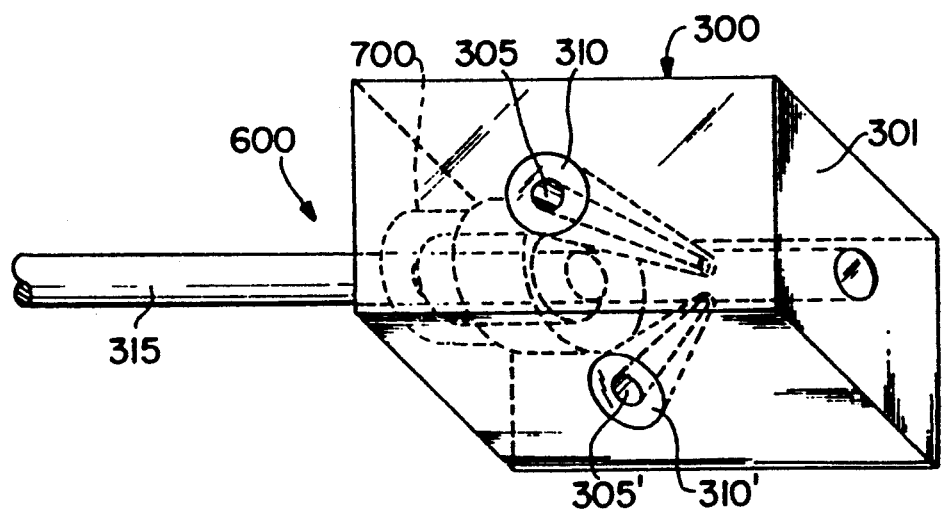
FIG. 9 is a perspective view of the cartridge shown in FIG. 7.

FIG. 2 shows cartridge 600 in position on dispensing apparatus 10. As shown in FIGS. 7-9, cartridge 600 comprises mixing assembly 300 and purging rod 315. Mixing assembly 300 includes block 301 formed of deformable material with longitudinal bore 302 extending from the front end to the rear end of the block. Block 301 is preferably constructed of an essentially monolithic piece of Teflon material with bore 302 longitudinally extending therethrough. Preferably, block 301 is parallelepiped, with a generally square cross-section.

Block 301, as best illustrated in FIGS. 7-9, includes two inlets 305 and 305' extending from the exterior surface of block 301 generally radially through the wall of the block and into mixing chamber 603 which constitutes a portion of longitudinal bore 302. Each of these inlets is oriented generally perpendicular with an exterior face of the Teflon core. Because the inlets are perpendicular to a flat face, forming the inlets in the block is very simple. And, because the core has a generally square cross-section, and the inlets are on adjacent faces, the inlets are offset from each other by 90°. Offsetting the inlets by this amount is believed to assist in prevention of clogging of the inlets. Preferably, inlets 305 and 305' are lined with non-deformable liners 310 and 310' to help retain their shape and size.

Purging rod 315 is slidably received within bore 302 and adapted to move within the bore from an extended position where the front end of purging rod 315 extends, to substantially the front end of the mixing chamber core or block 301 to a retracted position where the front end of the purging rod is rearward of inlets 305 and 305'.

Purging rod 315 is connected as depicted in FIG. 2. When this means of connection is used, piston rod 155 is hollow and extends through rear cover 145 of the air cylinder, where it is sealed against air leakage by seal 350, as well as through the front cover in the manner already described. In this embodiment, the purging rod is of extended length, and has a flattened connection tongue 355 at its rear end. The rear of piston rod 155 includes a rotatable connection nut 360 with a slot 365. The purging rod extends through the hollow piston rod to the rear of the piston rod until the connection tongue 355 extends through slot 365 in the connection nut. Rotating the nut 90° secures the connection tongue to the connection nut. To release the connection tongue, the nut is rotated back 90°. When released, the purging rod can be slid through the hollow piston rod in a generally forwardly direction until it is clear of the piston rod.

After an extended period of use, cartridge 600 of the present invention may become inoperative. In the present invention, mixing assembly 300 itself may be removed from the remainder of the apparatus with the purging rod therein. Because the mixing assembly is inexpensive, repair of rebuilding is unnecessary. When the mixing assembly becomes unusable for any reason, cartridge 600 is simply discarded and replaced with a new cartridge, assembly with a new mixing assembly and purging rod.

Figure 5:
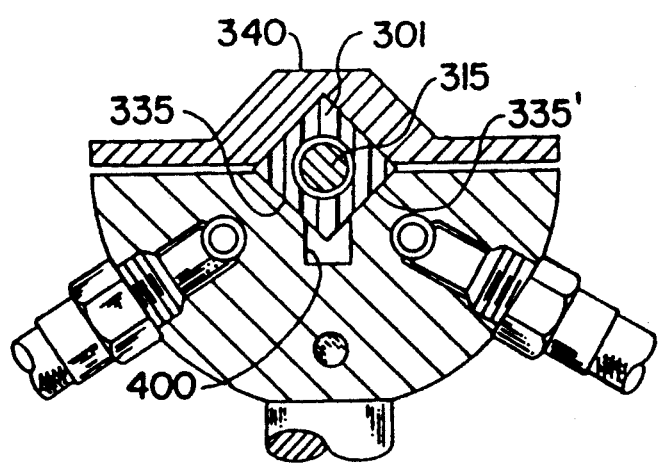
FIG. 5 is a cross-sectional view taken along the line 5—5 of FIG. 2 showing a portion of the conduits upstream of the valves.
Figure 6:
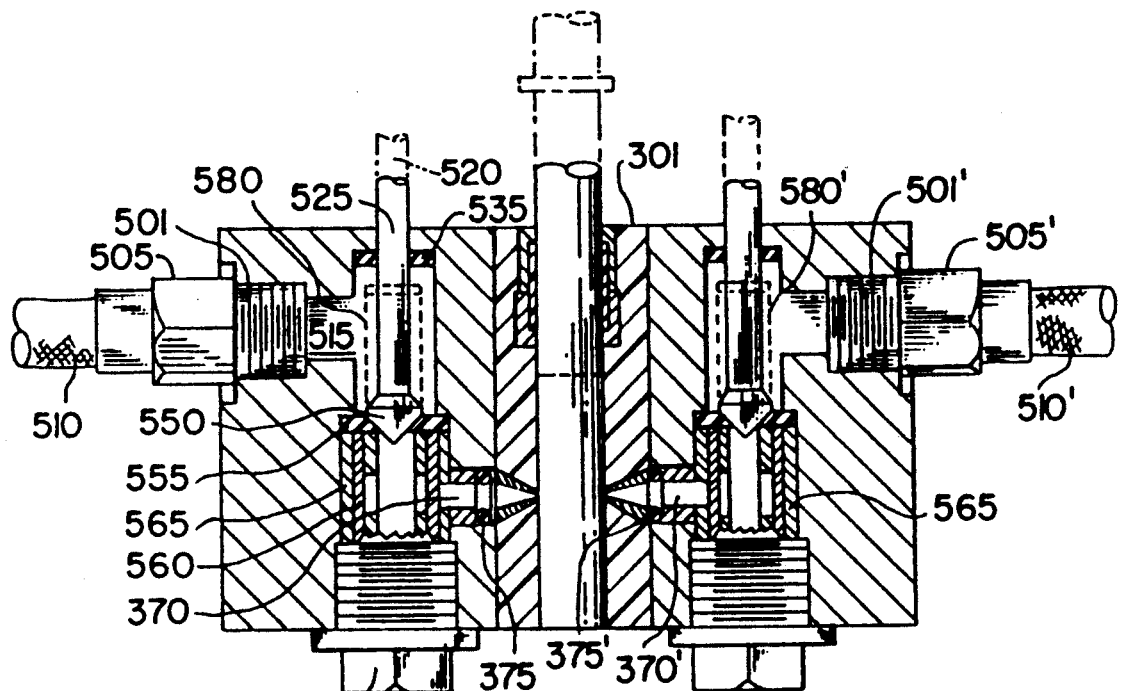
FIG. 6 is a cross-sectional view taken along the line 6—6 of FIG. 4 showing the arrangement of the valves with respect to the conduits and the mixing assembly.

To allow ready removal and replacement of the mixing assembly portion of the cartridge, block 301 is preferably directly supported by support surfaces 335 and 335' (FIG. 5). When block 301 is in place on the support surfaces, the inlets of the core align with respective exit openings 370 and 370' of the chemical conduits of the chemical valving portion, and are sealed from the outside by means of resilient O-ring seals 375 and 375' (FIG. 6).

Block 301 is detachably retained on support surfaces 335 by means of retainer 340. Retainer 340 is attached to the remainder of the front of the apparatus by means of bolts 390, although other means of attachment, such as a hinge could be equally well employed. To prevent undesired axial movement of the mixing chamber core during operation of the device, the retainer 340 includes two teeth 395 which extend into the deformable block, thus preventing axial movement when the retainer is in place. Alternatively, as shown in FIG. 11, a series of axially spaced channels or ridges 319 can be relied upon to prevent axial shifting. Ridges 319 are preferably about 0.03 of an inch in height which has proven sufficient to prevent axial shifting of block 301 with respect to retainer 340. When the bolts 390 are fastened, retainer 340 firmly holds mixing assembly 300 in place, and presses the inlets 305 and 305' into sealing contact with the exits of the conduits 370 and 371'.

It is desirable to ensure that the liners 310 and 310' are resiliently urged toward the rod 315 to maintain contact between the end of the liner and the rod. Maintenance of such contact prevents the Teflon material of the core from extruding underneath the liner to occlude the inlet. In accordance with the present invention, this is accomplished by positioning resilient O-ring seal 375 between the exit of the chemical conduit 370 and the entrance to the inlet 305 such that O-ring seal 375 presses against the entrance end of liner 310. Thus, the compression of the O-ring, which serves to seal this opening, also serves to resiliently urge the liners 310 and 310' into contact with the purging rod 315. In this way, Teflon and other contaminants which might occlude the inlet are prevented from coming between liners 310 and 310' and the purging rod.

Alternatively, a nylon or Nylatron washer can be used instead of an O-ring. The use of a nylon or Nylatron washer makes it easier to maintain dimensional control as compared with the more deformable O-ring.

It is desirable in the present invention to retain the mixing assembly to the remainder of the apparatus in such a way that stress will not build up between the purging rod and the bore of block 301. This is conveniently done by providing a slot 400 between the support faces 335, adjacent the lower corner of the block, into which the block can deform if any significant stress is accidentally developed on the block. Because stresses are not allowed to build up, large frictional forces between the purging rod and the bore of the mixing chamber core are not present. Thus, less actuating force is required to reciprocate the purging rod and undesirable cold flow tendencies are precluded.

Reference is again made to FIGS. 7-9 which show cartridge 600 in greater detail. Cartridge 600 comprises scraper assembly 700 which is shown positioned rearward of the inlet opening of liners 310 and 310' and with its rearward end 702 essentially coplanar with rearward end 601 of block 301. Scraper assembly 700 includes a first cup-shaped member 704 and a second cup-shaped member 706. FIG. 7 illustrates purging rod 315 in its forwardmost position. In this position, purging rod 315 preferably extends about 0.01 to 0.08 of an inch beyond the front end of block 301. FIG. 8 illustrates purging rod 315 in its rearwardmost position. In this position the front end of purging rod 315 is at about the axial centerpoint of the aperture formed in cup-shaped member 706.

Figure 10:
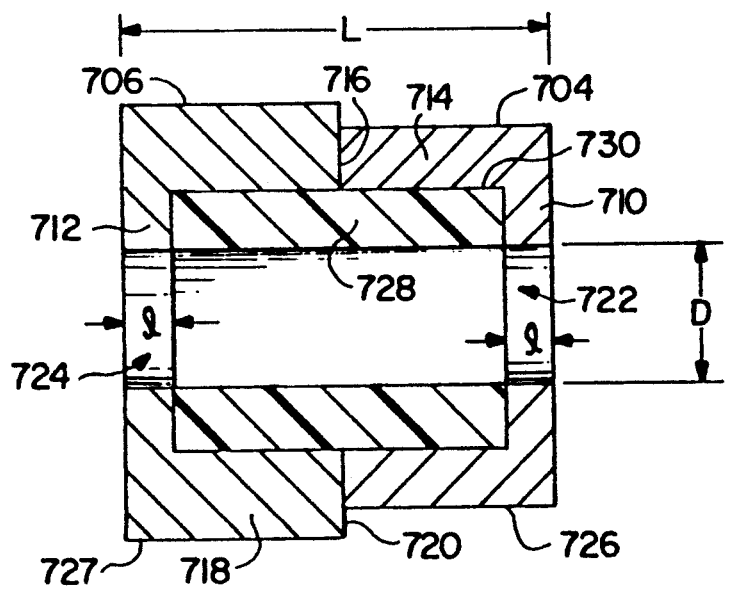
FIG. 10 is a cross-sectional view of the scraper assembly forming part of the mixing assembly.

As depicted in FIG. 10, cup-shaped member 704 includes base portion 710, side portion 714 and rim portion 716. Similarly, cup-shaped member 706 includes base portion 712, side portion 718 and rim portion 720. Aperture 722 is formed in base portion 710 while aperture 724 is formed in base portion 712. The surfaces defining apertures 722 and 724 provide both a bearing and scraping surface with respect to the reciprocating purging rod. Preferably the axial thickness of the bearing surfaces, designated 1, is the same for each and lies within the range of about 0.02 to 0.06 of an inch and more preferably about 0.04 of an inch.

As can be seen from FIG. 10, the cup-shaped members have different thickness side walls. Rearwardly positioned cup-shaped member 704 has side portion 714 which is thinner than side portion 718 of the forward positioned cup-shaped member. Recesses are formed in block 301 such that the interior surfaces of the cup-shaped members are commensurate while exterior surfaces 726 and 727 are offset from one another. A preferred thickness for side portion 714 is about 0.05 of an inch and a preferred thickness for side portion 718 is about 0.07 of an inch. The offset recesses formed in block 301 ensure that cup-shaped member 706 remains longitudinally in place with respect to the block. The compressive forces acting on block 301 generally provide sufficient frictional forces on the exterior 726 of cup-shaped member 704 to maintain cup-shaped member 704 in positioned during use. However, for further assurance against movement, clip 341 (FIG. 12) is attached to the rear end of the retainer 340. Clip 341 includes a semi-circular aperture which allows free passage (i.e., non-contact passage) of purging rod 315 but abuts against rearward end 702 of cup-shaped member 704 to preclude rearward movement thereof.

Cup-shaped members 704 and 706 are positioned in a manner which places rim portion 716 of cup-shaped member 704 in contact with rim portion 720 of cup-shaped member 706. The recesses in block 301 tend to maintain rim portions 716 and 720 in contact but each cup-shaped member is free to rotate about the longitudinal axis. The deformable nature of block 301 also allows for slight longitudinal movement of one cup-shaped member away from the other as the cup shaped members perform their scraping function of removing debris. This movement of the cup-shaped members, although only a slight movement, assists in the prevention of sticking of the purging rod within the mixing assembly.

Positioned between the base portion of each of the cup-shaped members is insert 728 which is also preferably formed of a deformable material such as Teflon. Insert 728 is essentially cylindrical in shape and has an exterior surface 730 in contact with the continuous internal side surfaces of the pair of cup-shaped members. The longitudinal bore extending through insert 728 is preferably of the same diameter as that of aperture 722, 724 or slightly less than apertures 722, 724 (e.g., a difference of about 0.002 of an inch). Insert 728 is also preferably designed to be relatively thin such as 0.05 of an inch in thickness. Insert 728, in addition to assisting in maintaining purging rod 315 in proper alignment, also helps to stabilize the scraping assembly by flexing so as to allow for a slight degree of movement between the two cup-shaped members.

To avoid having the inner surface of insert 728 abraded by built up material on the reciprocating rod, a toleranced gap of about 0.00035 to 0.0006 of an inch between the bearing surface of each cup-shaped member and the reciprocating rod is provided. The use of a rear cup-shaped member also provides a means of maintaining the integrity of the insert which acts to seal the rear of the mixing assembly. With the preservation of the insert, fluid is prevented from coming or flowing out past the rear cup-shaped member.

In providing proper alignment to the purging rod so as to avoid tilting and binding, the axial length L of scraper assembly 700 is preferably about 1.8 to 2.8, and more preferably about 2.26, times greater than the diameter D of the apertures.

The present invention also features interference fits between all visco-plastic components (e.g., insert 728) and surrounding metal components (e.g., cup-shaped member 706). These interference fits allow for the visco-plastic components to conform to the shape of the surrounding metal components and provide greater dimensional stability to the entire cartridge.

A cycle of operation of the mixing and dispensing apparatus will now be described, particularly with reference to FIGS. 2, 3, 7 and 8. FIG. 2 depicts one embodiment of the invention with the purging rod in the fully forward position so that the front of the purging rod is substantially at the front end of mixing assembly 300, which is the position that the purging rod would take when the trigger is not depressed. In this position, the yoke is clear of nut 540. When the yoke 165 is in this forward position, a spring 580 behind the conical nose 550 of the needle valve urges the cone of the needle valve into the seat 535 to form a pressure tight seal, prohibiting fluid flow through the conduit. Of course, the purging rod 315 is connected to the piston rod 155 and moves directly with it. Since both the purging rod and the yoke are mechanically linked to the piston rod 155, the purging rod and the yoke will reciprocate back and forth together.

When the trigger is depressed, the air valve moves rearwardly, compressed air flows to the front of the piston, forcing it rearwardly, and in turn retracting the yoke and the purging rod. During the initial portion of this rearward retraction, the valve 520 will remain in the closed position. After the yoke 165 has been moved rearwardly by the piston rod a sufficient distance to use up the space between the yoke and nut 540, the yoke will contact the nut. Upon contact with the nut, valve 520 will open (both sides). However, this does not occur until after the purging rod has moved sufficiently rearwardly to fully uncover the inlets 305 and 305' into the bore of the mixing chamber core.

It is important that valves 520 not begin to open until the front of the purging rod at least partially uncovers inlets 310, 310' to ensure that the chemical in the inlet directly adjacent purging rod is not under pressure when the rod fully covers the inlet. If this were to occur, the pressurized chemical would tend to seep around the rod to meet with chemical in the other inlet, causing premature reaction and clogging up the ports. After the valves begin to open, the piston rod 155, yoke 165 and purging rod 315 continue rearwardly to the fully retracted position where the inlets are fully uncovered and the valves are fully opened, permitting fluid to flow through the conduits and, in turn, through the inlets of the mixing chamber and into the bore where the chemicals mix and react and are discharged out the front of the bore.

When the desired quantity of chemical mixture has been dispensed, trigger 115 is released, causing air valve 170 to move forwardly and allow exhausting of the air in front of the piston and permitting entry of compressed air behind the piston, thus forcing the piston forward. As piston rod 155, yoke 165 and purging rod 315 move forwardly, spring 580 (FIG. 3) within each valve forces conical portion 550 of each valve towards its seat. As yoke 165 continues forwardly, at approximately the position where the valve began to open during the retraction stroke, the conical portion 550 of the valve will meet the valve seat, closing the valve. In this position, the front end of the purging rod is still in a position where it does not fully cover the inlets. Once the conical portion of the valve reaches the valve seat to fully close the valve, thus prohibiting fluid flow, the yoke and purging rod continue forwardly so that the purging rod fully covers the inlet ports and extend to just past the end of the mixing chamber core. This action purges the bore of the mixing chamber of any mixture, which if it was allowed to remain, would harden and clog the mixing chamber. The valve's closing of the chemical passageway while the purging rod's front end is rearward of the chemical inlets allows for the relief of fluid pressure in the passageway upstream from the valve and downstream from the inlets.

While purging rod 315 reciprocates within the mixing chamber, both the front and rear positioned cup-shaped members act to remove any build up on the purging rod. Scraper assembly 700, in addition to removing built up material on the purging rod, maintains the purging rod properly aligned while also providing dimensional stability to the mixing assembly. The insert forming part of the scraper assembly, in addition to promoting dimensional stability, also acts to preclude the flow of the reactant chemicals rearwardly out of the mixing assembly.

Of course, the function of the air piston and cylinder is to provide a reciprocating force to move the purging rod and yoke back and forth. If air or other compressed gas is unavailable, however, an electric driver such as a solenoid or a motor, may be substituted. Purely manual means of moving the purging rod and yoke back and forth may also be employed, but because the force required is large in relation to the strength of an average hand, non-manual means are preferred.

Figure 14A:
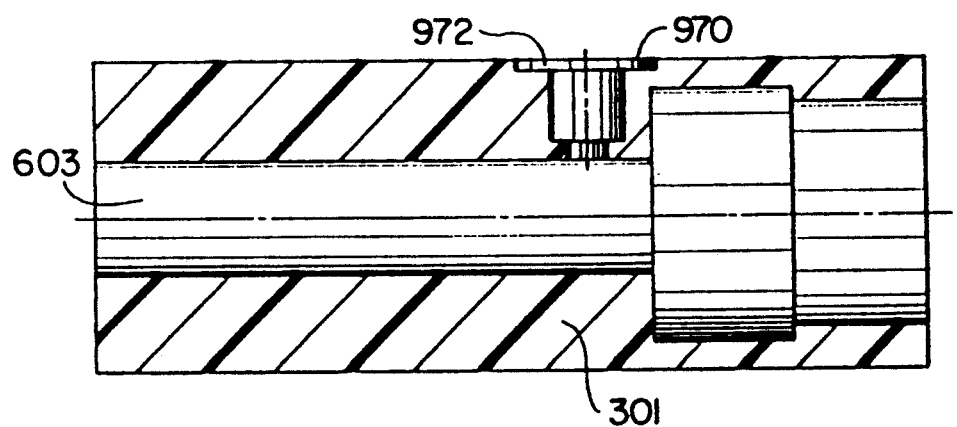
FIG. 14A shows a cross-sectional view of an alternate embodiment of the mixing assembly of the present invention.
Figure 14B:
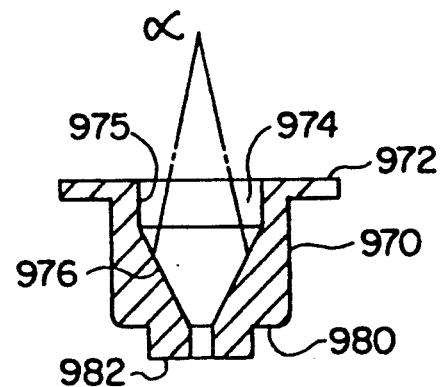
FIG. 14B shows in greater detail the nozzle insert shown in FIG. 14A.

FIGS. 14A and 14B show an improved nozzle insert 970 and its position within Teflon block 301. Nozzle insert 970 features flange 972 surrounding fluid passageway 974. Fluid passageway 974 is comprised of a cylindrical bore 975, a conical recess diverging at angle which is preferably about 60°, and a narrow diameter through-hole 983.

Flange 972 is fitted within a conforming recess formed in the exterior of block 301. In addition, nozzle insert 974 includes step portion 980 which is received in a corresponding bore within the interior of block 301 such that the bottom 982 is essentially commensurate with the surface defining mixing chamber 603. The outlet end 982 of nozzle insert 970 features a concave recess with a rim that is positioned commensurate with the interior surface of the deformable block. Also, the concave recess is immediately downstream from recess 976 and narrow through-hole 983 so as to create a resultant flow pattern in the chemical precursor upon entering the mixing chamber.

The design of nozzle insert 974 provides the advantage of maintaining the central axis of the nozzle insert perpendicular with respect to the longitudinal axis of block 302 despite contact with reciprocating purging rod 315 and a good intermixing of the two chemicals. Maintaining the nozzle insert perpendicularly aligned also provides for maximum impinging contact between the perpendicularly orientated fluid streams at the center of mixing chamber 603. Furthermore, flange 972 prevents nozzle insert 974 from being forced inward towards the center of mixing chamber 603.

FIGS. 15-18 show a further embodiment of the present invention. FIG. 15 shows a perspective view of cartridge assembly 1001 with mixing assembly 1003 and purging rod 1005 (partially cut away). Mixing assembly 1003 includes outer shell housing 1007 which is preferably formed of an essentially non-deformable material such as a metallic material. The dispensing or forward end 1009 of shell housing 1007 converges inwardly to define aperture 1011.

A low friction coating material 1013 is applied to the forward end 1009 of shell housing 1007 to provide a surface which mixed reactive chemicals do not readily adhere to such that cleaning is facilitated. A coating of Teflon material applied in three layers has proven acceptable for the purposes of the present invention.

FIG. 15 also reveals nozzle inlets 1019 and 1021 formed on adjacent sides 1015 and 1017 of quadrilateral cross-sectioned shell housing 1007. Notch 1023 is formed at one rearward corner of shell housing 1007 for alignment with a portion of the dispenser apparatus structure supporting cartridge 1001. As it is important for proper operation that the range of purge rod reciprocation coincide with the positioning of the mixing chamber and scraper assembly, notch 1023 provides a quick and easy way for the operator to position the mixing assembly with respect to the underlying dispenser support structure. With the notch, it is easy to place the mixing assembly such that the purge rod reciprocates between the dispensing end of the mixing assembly and the scraper means in the manner previously described for the other embodiment.

FIG. 16 shows an end view of cartridge 1001 taken in the direction of line D—D in FIG. 17. FIG. 17 shows a cross-sectional elevational view of cartridge 1001 along line E—E in FIG. 16.

FIG. 17 illustrates core member 1025 preferably formed of a deformable material such as a visco-plastic material (e.g., TEFLON TM material). Core member 1025 has exterior surface 1027 which is in contact with interior surface 1029 of shell housing 1007. Core member 1025 includes longitudinal passageway 1031 which at least partially defines a mixing chamber for the reactive chemicals being introduced through inlets 1019 and 1021.

As depicted in FIGS. 16 and 17, inlets 1019 and 1021 extend from the exterior surface of shell housing 1007, through deformable member 1025 and into the mixing chamber defined by longitudinal passageway 1031. Deformable member 1025 includes a converging outlet end which corresponds with the converging outlet end of shell housing 1007. Also, coating 1013 is illustrated in FIG. 17 to cover the converging outlet end of cartridge 1001.

Shell housing 1007 is shown in FIG. 18 to have circumferential groove 1033 formed just inwardly of the open, rear end 1035 of shell housing 1007. FIGS. 16 and 17 illustrate mixing assembly 1003 as including ring member 1037 positioned within circumferential grove 1033. Ring 1037 includes an aperture aligned with longitudinal passageway 1031.

FIG. 17 illustrates scraping assembly or scraping means 1039 positioned within the interior of mixing assembly 1003. Scraping means 1039 includes first cup-shaped member 1041 having base 104 side 1044, and rim 1045. Base 1043 is in an abutting relationship with deformable member 1025. Scraping means 1039 also includes second cup-shaped member 1047 which includes base 1049, side 1050, and rim 1051. Rims 1045 and 1051 are shown to be in contact with one another in FIG. 17. FIG. 17 also shows deformable insert 1053 retained within the recesses defined by each of said cup-shaped members. The external circumference (or periphery if formed in other than a cylindrical shape) of cup-shaped members 1041 and 1047 are preferably equal both with one another and with the external circumference of deformable member 1025. Cup-shaped members 1041 and 1047 each include an aperture in their base which is aligned with the longitudinal passageway 1031 and which is sized to receive (in a scraping relationship) purging rod 1005. A through-hole is also formed in deformable insert 1053 and is sized to snugly receive purging rod 1055. The tolerance range between the purge rod and cup-shaped members' apertures is the same as that which was described for the previous embodiment.

Scraping means 1039 is shown in FIG. 17 to be retained axially between retaining ring 1037 and the rear end of deformable member 1025. Base member 1049 is near or close to abutment with ring 1037 in a manner which does not compress deformable member 1025. In this way, deformable core member 1025 and scraping means 1039 are axially retained within the hollow provided by shell housing 1007 but are not placed in a state of axial compression.

FIG. 17 also shows inlet nozzle 1021 extending from an external surface of housing 1007 inwardly through deformable member 1025 so as to open into the mixing chamber defined by longitudinal passageway 1031. Nozzle inlet 1021 is also shown to be positioned in between the rearward end of deformable member 1025 and the longitudinal mid portion of deformable member 1025.

Mixing assembly 1003 is secured to a dispensing apparatus such as that shown in FIG. 1 in a manner similar to that shown in FIG. 5. That is, the non-deformable quadrilateral shell housing is compressed into position by clamping means such as 340 shown in FIG. 5. A preferred embodiment of the invention relies on the friction between the non-deformable shell housing, clamping member and underlying support structure to preclude axial shifting. Also, since the shell housing is essentially non-deformable teeth or ridges extending downwardly from the clamping means are not utilized. Also, a bracket as shown in FIG. 12 can be relied upon for additional securement although it is not believed necessary for proper securement of cartridge assembly 1001.

In operation, the scraping means provides the above described advantageous scraping function while purging rod 1005 reciprocates longitudinally to opposite sides of nozzle inlets 1019 and 1021 in passing to the coated discharge end of shell housing 1007.

Although the invention herein has been described with reference to the drawings and the particular embodiments described, it will be readily appreciated by those skilled in the art that many modifications can be made within the spirit and scope of the present invention and there is no intention by virtue of the foregoing description of excluding any such embodiments as encompassed within the scope and spirit of the present invention as defined by the appended claims.

What is claimed is:

1. A cartridge assembly for use with a dispenser of reactive chemicals, comprising:
   a purging member;
   a mixing assembly which has a forward and a rearward end, said mixing assembly including a deformable member having a longitudinal passageway formed therein which defines a mixing chamber and the longitudinal passageway extending to form a forward outlet opening and a rearward opening in said deformable member, said mixing assembly including an exterior surface, and said mixing assembly including first and second chemical passageways which extend from the exterior surface, pass through said deformable member at a position between the forward and rearward openings in said deformable member, and open into the mixing chamber;
   said purging member being adapted for reciprocal travel within the mixing chamber and to positions forward and rearward of said first and second chemical passageways;

scraping means for avoiding build up of the reactive chemicals on said purging member, said scraping means including first and second cup-shaped members with each of said cup-shaped members having a base portion, a side portion and a rim portion with the base, side and rim portions of each cup-shaped member defining a recess, and said cup-shaped members being positioned within said mixing assembly such that said rim portions are positioned adjacent one another, the base portions of said first and second cup-shaped members including an aperture in alignment with said longitudinal passageway, said scraping means further comprising a deformable insert which includes a first and a second end with said first end of said insert positioned within the recess of said first cup-shaped member and the second end of said deformable insert positioned within the recess of said second cup-shaped member, said insert including a through-hole which is aligned with said longitudinal passageway, and said purging member being dimensioned and arranged for reciprocal travel within said longitudinal passageway, said aligned through-hole of said deformable insert and the apertures formed in said cup-shaped members; the apertures in said cup-shaped members being sized so as to place said cup-shaped members in a scraping relationship with said purging member, and wherein said mixing assembly includes an essentially non-deformable shell housing having an exterior which defines the exterior surface of said mixing assembly, said shell housing having an interior surface in contact with an exterior surface of said deformable member, and said first and second chemical passageways extending through said shell housing.

2. A cartridge assembly as recited in claim 1, wherein said shell housing includes an inner-circumferential groove and said mixing assembly includes a ring member which is positioned within said circumferential groove, said ring member having an aperture formed therein which is aligned with said longitudinal passageway and adapted to receive said purging member therethrough, and said scraping means being positioned and retained between said deformable member and said ring member.

3. A cartridge assembly as recited in claim 2, wherein said shell housing includes an open rearward end and a dispensing end which converges to form an aperture that is aligned with said longitudinal passageway and dimensioned so as to receive therethrough said purging member.

4. A cartridge assembly as recited in claim 3, wherein said deformable member includes a converging end which corresponds to the converging end of said shell housing.

5. A cartridge assembly as recited in claim 2, wherein said mixing assembly include first and second non-deformable nozzle inlet members with said first nozzle inlet member having an interior surface which defines at least part of said first chemical passageway and said second nozzle inlet member having an interior surface which defines at least part of said second chemical passageway and the interior surface of said first and second nozzle inlet members defining a concave recess.

6. A cartridge assembly as recited in claim 5, wherein said nozzle inlet members extend radially from the exterior surface of said shell housing towards said mixing chamber and have a central axis which essentially intersect at a common point along a central axis of said longitudinal passageway.

7. A cartridge assembly as recited in claim 6, wherein said nozzle inlet members are positioned closer to said scraping means than to the forward outlet opening in said deformable member.

8. A cartridge assembly as recited in claim 1, wherein said shell housing includes an open end and a second end which converges to form an aperture that is aligned with said longitudinal passageway and dimensioned to receive said purging member.

9. A cartridge assembly as recited in claim 8, wherein said deformable member includes a converging end which corresponds to the converging second end of said shell housing.

10. A cartridge assembly as recited in claim 9, wherein said mixing assembly includes a coating material applied to the shell housing and having a coefficient of friction that is less than that of said shell housing so as to facilitate removal of deposits of the chemical reactants.

11. A cartridge assembly as recited in claim 1, wherein said cup-shaped members have an external circumference essentially the same as that of said deformable member and the base of one of said cup-shaped members is in an abutting relationship with one end of said deformable insert.

12. A cartridge assembly as recited in claim 11, wherein said rims of said first and second cup-shaped members are in contact and said deformable insert extends from one of said bases to the other of said bases.

13. A cartridge assembly as recited in claim 11, wherein said mixing assembly includes an external shell housing having a forward dispensing end and a rear end, said mixing assembly further comprising a retaining ring member axially fixed with respect to said shell housing, said deformable member being positioned within and at the forward end of said shell housing, said scraping means being positioned rearward of said deformable member and forward of said retaining ring, and said retaining ring being dimensioned and arranged to limit axial movement of said scraping means along the central axis of said longitudinal passageway.

14. A cartridge assembly for use with a dispenser of reactive chemicals, comprising:
a purging member;
a mixing assembly which has a forward and a rearward end, said mixing assembly including a deformable member having a longitudinal passageway formed therein which defines a mixing chamber and the longitudinal passageway extending to form a forward outlet opening and a rearward opening in said deformable member, said mixing assembly including an exterior surface, and said mixing assembly including first and second chemical passageways which extend from the exterior surface, pass through said deformable member at a position between the forward and rearward openings in said deformable member, and open into the mixing chamber;
said purging member being adapted for reciprocal travel within the mixing chamber and to positions forward and rearward of said first and second chemical passageways;
scraping means for avoiding build up of the reactive chemicals on said purging member, said scraping means including first and second cup-shaped members with each of said cup-shaped members having a base portion, a side portion and a rim portion with the base, side and rim portions of each cup-shaped member defining a recess, and said cup-shaped members being positioned within said mixing assembly such that said rim portions are positioned adjacent one another, the base portions of said first and second cup-shaped members including an aperture in alignment with said longitudinal passageway, said scraping means further comprising a deformable insert which includes a first and a second end with said first end of said insert positioned within the recess of said first cup-shaped member and the second end of said deformable insert positioned within the recess of said second cup-shaped member, said insert including a through-hole which is aligned with said longitudinal passageway, and said purging member being dimensioned and arranged for reciprocal travel within said longitudinal passageway, said aligned through-hole of said deformable insert and the apertures formed in said cup-shaped members; the apertures in said cup-shaped members being sized so as to place said cup-shaped members in a scraping relationship with said purging member, and wherein said cup-shaped members have an external circumference essentially the same as that of said deformable member and the base of one of said cup-shaped members is in an abutting relationship with one end of said deformable insert.

15. A cartridge assembly as recited in claim 14, wherein said rims of said first and second cup-shaped members are in contact and said deformable insert extends from one of said bases to the other of said bases.

16. A cartridge assembly as recited in claim 14, wherein said mixing assembly includes an external shell housing having a forward dispensing end and a rear end, said mixing assembly further comprising a retaining ring member axially fixed with respect to said shell housing, said deformable member being positioned within and at the forward end of said shell housing, said scraping means being positioned rearward of said deformable member and forward of said retaining ring, and said retaining ring being dimensioned and arranged to limit axial movement of said scraping means along the central axis of said longitudinal passageway.

17. A cartridge assembly for use with a dispenser of reactive chemicals, comprising:
a purging member;
a mixing assembly which has a forward and a rearward end, said mixing assembly including a deformable member having a longitudinal passageway formed therein which defines a mixing chamber and the longitudinal passageway extending to form a forward outlet opening and a rearward opening in said deformable member, said mixing assembly including an exterior surface, and said mixing assembly including first and second chemical passageways which extend from the exterior surface, pass through said deformable member at a position between the forward and rearward openings in said deformable member, and open into the mixing chamber;
said purging member being adapted for reciprocal travel within the mixing chamber and to positions forward and rearward of said first and second chemical passageways;
scraping means for avoiding build up of the reactive chemicals on said purging member, said scraping means including first and second cup-shaped members with each of said cup-shaped members having a base portion, a side portion and a rim portion with the base, side and rim portions of each cup-shaped member defining a recess, and said cup-shaped members being positioned within said mixing assembly such that said rim portions are positioned adjacent one another, the base portions of said first and second cup-shaped members including an aperture in alignment with said longitudinal passageway, said scraping means further comprising a deformable insert which includes a first and a second end with said first end of said insert positioned within the recess of said first cup-shaped member and the second end of said deformable insert positioned within the recess of said second cup-shaped member, said insert including a through-hole which is aligned with said longitudinal passageway, and said purging member being dimensioned and arranged for reciprocal travel within said longitudinal passageway, said aligned through-hole of said deformable insert and the apertures formed in said cup-shaped members; the apertures in said cup-shaped members being sized so as to place said cup-shaped members in a scraping relationship with said purging member, and wherein said mixing assembly includes an external shell housing having a forward dispensing end and a rear end, said mixing assembly further comprising a retaining ring member axially fixed with respect to said shell housing, said deformable member being positioned within and at the forward end of said shell housing, said scraping means being positioned to the rear of said deformable member and forward of said retaining ring, and said retaining ring being dimensioned and arranged to limit axial movement of said scraping means along the central axis of said longitudinal passageway.

* * * * *